(12) United States Patent
McCusker et al.

(10) Patent No.: US 7,633,428 B1
(45) Date of Patent: Dec. 15, 2009

(54) WEATHER DATA AGGREGATION AND DISPLAY SYSTEM FOR AIRBORNE NETWORK OF MEMBER AIRCRAFT

(75) Inventors: Patrick D. McCusker, Center Point, IA (US); Eric N. Anderson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 237 days.

(21) Appl. No.: 11/014,118

(22) Filed: Dec. 15, 2004

(51) Int. Cl.
*G01S 13/95* (2006.01)
(52) U.S. Cl. ................................................ 342/26 B
(58) Field of Classification Search ............... 342/26 R, 342/26 B; 73/170.16–170.28; 701/10
See application file for complete search history.

(56) References Cited

U.S. PATENT DOCUMENTS

| | | | | |
|---|---|---|---|---|
| 5,493,309 | A * | 2/1996 | Bjornholt | 342/455 |
| 6,043,756 | A * | 3/2000 | Bateman et al. | 340/945 |
| 6,201,494 | B1 * | 3/2001 | Kronfeld | 342/26 R |
| 6,381,538 | B1 * | 4/2002 | Robinson et al. | 701/211 |
| 6,441,773 | B1 * | 8/2002 | Kelly et al. | 342/26 R |
| 6,448,922 | B1 * | 9/2002 | Kelly | 342/26 R |
| 6,501,392 | B2 * | 12/2002 | Gremmert et al. | 340/971 |
| 6,577,947 | B1 * | 6/2003 | Kronfeld et al. | 701/202 |
| 6,650,972 | B1 * | 11/2003 | Robinson et al. | 701/3 |
| 6,667,710 | B2 * | 12/2003 | Cornell et al. | 342/26 R |
| 6,694,249 | B1 * | 2/2004 | Anderson et al. | 701/120 |
| 6,744,382 | B1 * | 6/2004 | Lapis et al. | 340/971 |
| 6,751,532 | B2 * | 6/2004 | Inokuchi | 701/14 |
| 6,828,922 | B1 * | 12/2004 | Gremmert et al. | 340/949 |
| 6,865,452 | B2 * | 3/2005 | Burdon | 701/3 |
| 6,867,727 | B1 * | 3/2005 | Mitra | 342/59 |
| 6,937,937 | B1 * | 8/2005 | Manfred et al. | 702/2 |
| 6,977,608 | B1 * | 12/2005 | Anderson et al. | 342/26 B |
| 7,069,147 | B2 * | 6/2006 | Manfred et al. | 702/2 |
| 2006/0155432 | A1 * | 7/2006 | Brown | 701/14 |

OTHER PUBLICATIONS

Airlines Electronic Engineering Committee; Airborne Weather Radar; ARINC Characteristic 708-6; Nov. 15, 1991; pp. 64-71 (Attachment 15).
http://en.wikipedia.org/wiki/ARINC_708; ARINC 708; Printed Apr. 1, 2009; 2 Pages.

* cited by examiner

*Primary Examiner*—Khoi Tran
*Assistant Examiner*—Shelley Chen
(74) *Attorney, Agent, or Firm*—Daniel M. Barbieri

(57) ABSTRACT

A weather data aggregation and display system for displaying weather radar information to a pilot of a member aircraft of an airborne network of member aircraft. The weather data aggregation and display system includes an airborne network system (ANS) positioned on the member aircraft adapted to receive incoming geo-referenced weather data regarding Significant Meteorological Systems (SMS) from associated airborne network systems positioned on other member aircraft. A data processing system (DPS) is coupled to the airborne network system for generating the member aircraft's perspective of the SMS, based on the incoming weather data and the member aircraft's navigation and attitude information. The DPS provides DPS output weather data. An airborne display system (ADS) is positioned on the member aircraft and coupled to the data processing system. The airborne display system is adapted to receive the DPS output weather data and in response thereto display desired weather imagery of the Significant Meteorological Systems. The ANS is adapted to re-transmit the incoming geo-referenced weather data to associated airborne network systems positioned on other member aircraft.

19 Claims, 2 Drawing Sheets

WEATHER DATA AGGREGATION AND DISPLAY SYSTEM FOR AIRBORNE NETWORK OF MEMBER AIRCRAFT

BACKGROUND OF THE INVENTION

1. Field of the Invention

The present invention relates to weather radar systems and more particularly to a weather data aggregation and display system that utilizes a network of member aircraft for sharing data to provide weather imagery of Significant Meteorological Systems.

2. Description of the Related Art

Weather has been identified as a cause or contributing factor to nearly 25% of aviation accidents and 35% of fatalities. Accidents occur when a chain of events leads to a failure of an aircraft system, a mistake on the part of the crew piloting the aircraft, or a combination thereof. Improved levels of weather information and the use of pilot decision aids may be helpful in breaking the chain of events that leads to an accident.

Significant Meteorological Systems (SMS) are weather systems that represent a hazard or potential hazard to an aircraft. The typical Significant Meteorological System is a storm that includes clouds, winds, precipitation (rain, snow, hail, etc), or icing conditions.

In today's environment, the flight crew only has three sources of data regarding Significant Meteorological Systems that may be present along the intended flight path of the aircraft.

1. The flight crew receives weather briefings in text format prior to departure.

2. The flight crew receives weather updates during the flight in voice or text format via aircraft-to-ground communications systems.

3. The flight crew sees the output of the Airborne Weather Radar System which is installed on the aircraft.

On small aircraft (i.e. general aviation aircraft) the flight crew generally only has access to the first two forms of weather data, because the aircraft do not typically carry a weather radar system.

Airborne Weather Radar Systems collect data regarding Significant Meteorological Systems by transmitting an RF signal and measuring the return signal from the Significant Meteorological System. The magnitude of the returned signal is dependent upon the amount of moisture in the Significant Meteorological System. Modern radar systems typically measure intensity of precipitation, range, bearing, and azimuth to the precipitation, as well as the velocity of the precipitation (and by implication the winds that carry the precipitation).

The output of the Airborne Weather Radar System is typically displayed as a weather map to the flight crew on flight deck display. However, many modern radar system can also provide electronic data representations of the precipitation intensity, distance to the precipitation, direction and speed of the precipitation (and the winds that carry the precipitation) to other computing systems. This allows another computing system to "interpret" the data and to "produce" information. This new information can then be rendered into images for display on a flight deck display or can be used perform hazard assessments or other analyses of the information.

The existing technology for airborne weather radar systems provides a raster image of the storms ahead of the aircraft. The range is variable from 10 to 160 Nm. This provides a limited view of the storm. The range is limited to 160 Nm or less which is 15 minutes or less into the future at cruise speeds. The field of view is limited by the installation design of the system and can vary from +/−60 degrees to +/−90 degrees. The flight crew cannot always see through very heavy storms which are the most dangerous to the aircraft.

Emerging technologies allow the merging of real-time weather images from the onboard radar system with uplinked images to form a more complete understanding of the storm. The ground-based Doppler Weather Radar systems that provide the detailed storm images for uplink to the aircraft are only available in developed countries (they are predominately in the U.S.). Thus, enhanced WXR capability is not available for the majority of the earth's land masses or for any of the oceanic regions.

Furthermore, the update rate on the uplinked weather is rather slow (15 minute intervals).

Additionally, data correlation between airborne and ground based radar is difficult. There is a slow update rate for uplinked weather (15 minute intervals). There are data/image differences due to large differences in altitudes and beam azimuths between airborne and ground systems.

U.S. Pat. No. 6,441,773, issued to Kelly et al, discloses a radar displaying system and method for use in displaying weather radar information on a cockpit display of an aircraft involving receiving on-board weather radar information from an on-board weather radar system and ground-based weather radar information up-linked to the aircraft from a ground-based weather radar system. The information from the on-board weather radar system and the information from the ground-based weather radar system are combined to generate composite weather radar information. In response to the composite information, the cockpit display simultaneously displays both on-board weather radar imagery and ground-based weather radar imagery.

U.S. Pat. No. 6,201,494, also issued to Kronfeld et al, discloses an automatic storm finding weather radar that uses a storm finding algorithm to automatically control the weather radar to eliminate manual control. The storm finding algorithm uses the 0 degree Centigrade isotherm altitude where precipitation is most likely to first occur to calculate an altitude search layer to find storms. The storm finding algorithm calculates the antenna upper and lower tilt angles and the number of scans to search the altitude search layer. A list of useable antenna tilt values is formed to drive the antenna controller. The antenna controller scans the antenna at the lower tilt angle and then moves to the next tilt angle until the search is complete. The search is then repeated using any new data.

U.S. Pat. No. 6,744,382, issued to Lapis et al, discloses an apparatus and method for displaying weather and other hazard information to a pilot with additional content which helps a pilot avoid no-fly-zones and to prepare a new flight path through a group of widely scattered thunderstorms. The display shows a no-fly-zone around the storm and the no-fly-zone is depicted differently, depending upon variables, such as distance from the aircraft, velocity of the storm being tracked and others.

U.S. Pat. No. 6,043,756, issued to Bateman et al, entitled "Aircraft Weather Information System," discloses a system and method for downlinking weather data, generated by existing weather and data sensors, to a ground station. The ground station utilizes data from multiple aircraft to form refined weather information, and uplinks the refined weather information to the aircraft. The refined weather information is stored at the aircraft and picture generating equipment, such as an existing onboard ground proximity terrain picture and symbol generator, generates pictorial information depicting weather. The pictorial information is displayed, for example by an existing EFIS or weather radar display, in the form of polygons.

U.S. Ser. No. 11/014,431, entitled, "Atmospheric Data Aggregation And Forecasting System", filed concurrently herewith, by co-applicants, E. Anderson and P. McCusker, and assigned to the present assignee, discloses an atmospheric data aggregation and forecasting system that utilizes a network of member aircraft for collecting and sharing data to be used as inputs to atmospheric and turbulence forecasting tools and methods. This co-filed patent application is incorporated by reference herein in its entirety.

SUMMARY OF THE INVENTION

In a broad aspect, the present invention is a weather data aggregation and display system for displaying weather radar information to a pilot of a member aircraft of an airborne network of member aircraft. The weather data aggregation and display system includes an airborne network system (ANS) positioned on the member aircraft adapted to receive incoming geo-referenced weather data regarding Significant Meteorological Systems (SMS) from associated airborne network systems positioned on other member aircraft. A data processing system (DPS) is coupled to the airborne network system for generating the member aircraft's perspective of the SMS, based on the incoming weather data and the member aircraft's navigation and attitude information. The DPS provides DPS output weather data. An airborne display system (ADS) is positioned on the member aircraft and coupled to the data processing system. The airborne display system is adapted to receive the DPS output weather data and in response thereto display desired weather imagery of the Significant Meteorological Systems. The ANS is adapted to re-transmit the incoming geo-referenced weather data to associated airborne network systems positioned on other member aircraft.

Each source/consumer aircraft of the network of aircraft each further includes a weather radar system (WRS) coupled to its ANS for providing WRS output data to the ANS. This local data can be transmitted by the ANS to other member aircraft.

Source/consumer aircraft may combine, merge, or otherwise integrate the data from multiple Source Aircraft (which may or may not include itself to create a composite model of weather information regarding a Significant Meteorological System. The "consumer" aircraft may then use the composite weather information to generate two-dimensional or three-dimensional images of the Significant Meteorological System for display on a flight deck display.

A "baseline" solution results in a highly integrated display of current information about a Significant Meteorological System. The flight crew can then integrate this information with other information on the flight deck to produce "knowledge" of the current situation to facilitate good decision making. Prior to this solution, the flight crew either lacked a complete, current set of information regarding a Significant Meteorological System or were working with "data" from a wide variety of sources in formats that did not facilitate the integration of the data by the flight crew (i.e. textual descriptions of the system provided by ground systems). The baseline solution represents a significant improvement in situation awareness of the flight crew and greatly enhances the safety of operations in the vicinity of Significant Meteorological Systems.

Alternatively, a computing system onboard the consumer aircraft may perform analyses or processing on the weather information to detect hazards or threats to the aircraft from the Significant Meteorological System to predict the future progress of the Significant Meteorological System or to determine other knowledge about the behavior of the Significant Meteorological System.

An "advanced" solution allows computing systems on the aircraft to perform the integration of all current information about a Significant Meteorological System to reduce the burden on the flight crew. The resulting knowledge of the current situation can be used to automatically detect hazardous operating conditions for aircraft and to recommend actions the flight crew should take to avoid the hazards prior to engaging the hazard. The advanced solution further enhances the safety of operations in the vicinity of Significant Meteorological Systems.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
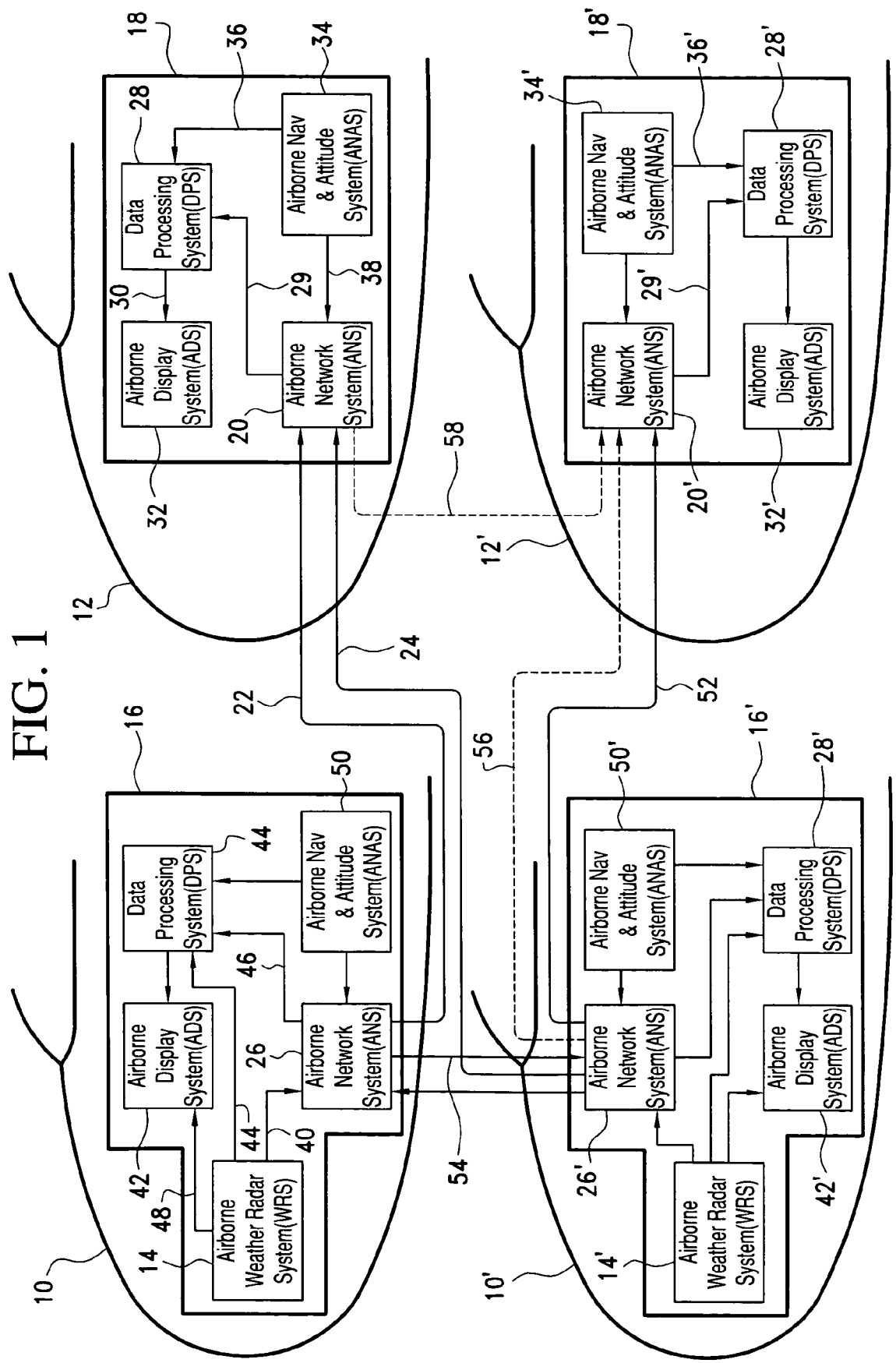
FIG. 1 is a system flow diagram of the weather data aggregation and display system of the present invention.

Referring now to the drawings and the characters of reference marked thereon, FIG. 1 illustrates an airborne network of member aircraft, the aircraft designated generally as 10, 10', 12, and 12'. The aircraft designated as 10, 10' are source/consumer aircraft which are each equipped with an airborne Weather Radar System (WRS) 14, 14'. The consumer aircraft are not equipped with WRS's however they are suitably equipped to receive and process airborne Weather Radar Data. It is understood that although this figure shows only four aircraft there may be numerous aircraft in the airborne network.

In general, all member aircraft will be "consumer" aircraft. However, there may be cases where a member aircraft acts only as a conduit for moving airborne Weather Radar Data through the network even though it does not produce or consume the data. In general, most member aircraft will be source/consumer aircraft. However, it will be common for small aircraft (e.g., a general aviation aircraft) to participate only as consumer aircraft, thereby reaping the benefit of seeing airborne Weather Radar Data from larger aircraft (e.g., business, regional, and air transport aircraft).

The weather data aggregation and display systems of the present invention are designated generally as 16, 16' for each respective source/consumer aircraft 10, 10'. The respective weather data aggregation and display systems for consumer aircraft 12, 12' are designated generally as 18, 18'.

Referring to consumer aircraft 12, the weather data aggregation and display system 18 includes an airborne network system (ANS) 20 positioned on the member aircraft 12 adapted to receive incoming geo-referenced weather data 22, 24 regarding Significant Meteorological Systems (SMS) from associated airborne network systems 26, 26' positioned on other member aircraft. As will be explained below in more detail the ANS 20 is also adapted to re-transmit the incoming geo-referenced weather data to associated airborne network systems positioned on other member aircraft.

The ANS 20 may be a broadband network such as a high bandwidth ad hoc network, HF/VHF ACARS (Aircraft Communications Addressing and Reporting System) network, or other emerging network service such as Connexion™ by Boeing. There may be direct aircraft-to-aircraft communications or indirect communications via a ground station or satellite.

A data processing system (DPS) 28 is coupled to the airborne network system 20 for generating the member aircraft's perspective of the Significant Meteorological Systems (SMS), based on the incoming weather data 29 and the member aircraft's navigation and attitude information. The DPS 28 provides DPS output weather data 30. In a baseline system the DPS 28 is a graphics processing system and the weather data 30 provided is composite weather graphics. The composite weather graphics may be as defined in ARINC 708, ARINC 661, a next generation of ARINC 661 or equivalent, or any future suitable aviation standard. The composite weather graphics may also be defined in standardized commercial markup languages such as Hyper Text Markup Language (HTML), Standard Generalized Markup Language (SGML), eXtensible Markup Language (XML) or future standards.

ARINC 708 uses angles, range bins and intensity levels to pass the weather radar information to a display. The display (discussed below) processes this data into a graphical image. Range bins go from near to far along the active pointing angle (specific ranges and sizes vary based on range settings). Intensities go from high to low and are associated with specific colors on the display (none, green, yellow, red, magenta). Some radars pre-process data or store data from multiple sweeps and generate ARINC 708 outputs that are filtered (to remove ground clutter for example) or used to identify additional hazards (windshear, turbulence). ARINC 661 is a more recent graphical interface standard for airplanes that defines a standardized Graphical User Interface between user applications and the airborne display system. The ARINC 661 Specification includes widgets (simple graphical objects and functions) that are used to manage dynamic map windows.

In a more advanced system, the weather data may be standard weather graphics such as advisories, alerts, and advanced weather graphics. It may be ARINC 708 or 661 interface data and aircraft position and altitude data. Depending on the source radar system the data could be, for example, packaged ARINC 708 data, which would allow for development of a better composite data than an overlay/matchup of images. For more advanced source radars this may involve multiple sweeps of nearly the same area ("nearly the same" since the source is moving) in different operating modes/power settings. The data being sent is still formatted based on ARINC 708 but different meanings are assigned based on the mode. Instead of intensity (reflectivity) the range bins now are used to identify velocity (Doppler), likely turbulence or temperature. Or, the sweep angles may be vertical instead of horizontal which allows the development of a 3-D representation of the SMS.

An airborne display system (ADS) 32 is positioned on the member aircraft 12 and coupled to the data processing system 28. The airborne display system 32 is adapted to receive the DPS output weather data 30 and in response thereto display desired weather imagery of the Significant Meteorological Systems (SMS).

The ADS 32 may be, for example, what is referred to informally as a glass cockpit display system or more formally as an Electronic Flight Instrument System (EFIS). (A low cost albeit unlikely implementation may utilize a tablet PC.)

The display of the baseline system is generally limited to a display of horizontal views of the storm from either the point of view of the consuming member aircraft or possibly a pilot selected position and orientation. In the advanced system, the DPS 44 maintains a model (representation) of the SMS based on the received data and can present the pilot with different views/data, i.e. similar to what a radar system can do. This may include, for example, only displaying areas with likely turbulence, displaying cell tops, and/or vertical views of the SMS.

An airborne navigation and attitude system (ANAS) 34 is optionally coupled to the DPS 28 and ANS 20 for sensing and distributing aircraft geo-referenced position (i.e. latitude, longitude, and altitude) and aircraft geo-referenced attitude (i.e. pitch, roll, and heading) ANAS output data 36, 38 to the DPS 28 and the ANS 20. ANAS 20 output data is used by the DPS 28 to rotate and/or translate weather information from multiple source aircraft so that the information can be combined, merged, or otherwise integrated. It is understood that the ANAS may comprise separate navigation and attitude systems.

As mentioned above, the source/consumer aircraft 10, 10' include weather radar systems 14, 14' in addition to the other elements noted above regarding the consumer aircraft 12, 12'. There are a few optional ways in which output from the WRS 14 may be utilized. In one option, the WRS 14 is coupled to the ANS 26 and provides WRS output data 40 for use by other aircraft in the airborne network. The WRS 14 may be coupled directly to the DPS 44 directly (as noted by numeral designation 44). The WRS 14 may be coupled to the DPS 44 via the ANS 26 which receives the DPS directed ANS output 46. The weather radar system used may be of a type manufactured by present assignee such as the Collins WXR-2100 MultiScan™ Radar.

With current aircraft systems the WRS 14 (when available/installed) is usually directly coupled with the ADS 42 (as shown by numeral designation 44) to provide cockpit weather data. The addition of the WRS 14 to the described consumer aircraft configuration will likely (but need not) include this direct coupling to the ADS 42 while also making weather data available to the ANS or the DPS.

Each member aircraft is essentially a communications node that can not only transmit and receive local data but also re-transmit any received data to any other node (member). Thus, even if there is no direct RF path between members any communications node in the network can re-transmit any received data.

Although these communications nodes have been discussed with reference to aircraft there may be terrestrial nodes, space-based nodes, or maritime nodes.

The optional use of the airborne navigation and attitude system (ANAS) 50 is as described above relative to the consumer aircraft 12, 12'.

In operation, in which there is no data forwarding, consumer aircraft 12 receives data from both source/consumer aircraft 10, 10', as indicated by numeral designations 22 and 24. Consumer aircraft 12' cannot receive data direct from source/consumer aircraft 10 (i.e. it is out of network range) so it has only partial data based on source/consumer aircraft 10', as denoted by arrow 52.

If there is data forwarding, consumer aircraft 12 receives data from both source/consumer aircraft 10, 10', as indicated by numeral designations 22 and 24, as noted above. Consumer aircraft 12' cannot receive data direct from source/consumer aircraft 10 (i.e. it is out of network range) but can get data from source/consumer aircraft 10 from either: 1) source/consumer aircraft 10' (along with source/consumer aircraft 10' data), as shown by arrows 54 and 56; or 2) consumer aircraft 12, as shown by arrow 58. There is some additional latency in the data from source/consumer aircraft 10 but the data from both sources is available.

Figure 2:
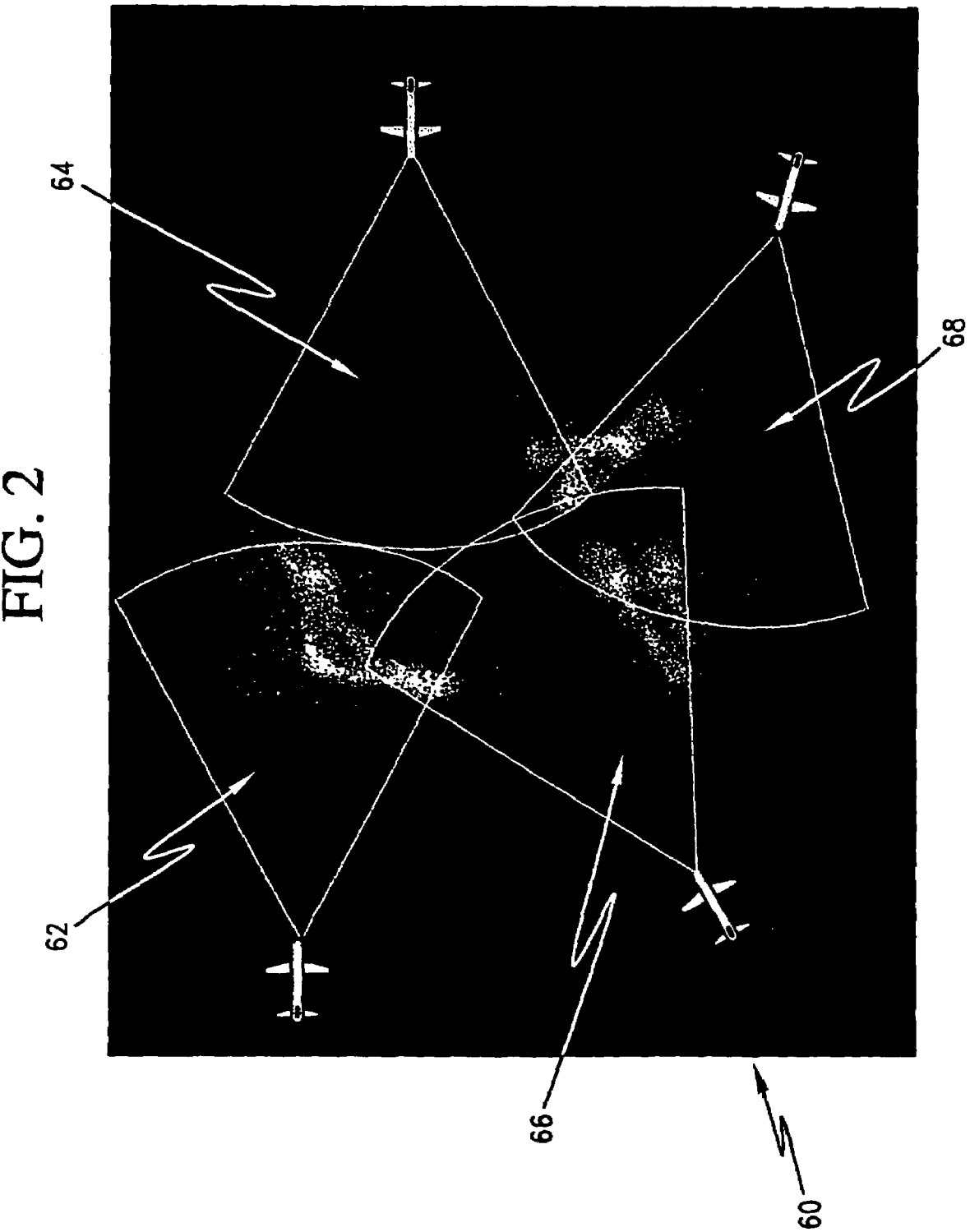
FIG. 2 is an example display showing a composite view of the weather data aggregation in accordance with the principles of the present invention.

Referring now to FIG. 2, a display of a baseline version is illustrated, designated generally as 60. This display 60 is generated by creating a composite image from geo-referenced images 62, 64, 66, 68. (Each image is a view of the weather system (SMS) from a specific location.) Placing each view into a single image provides a composite view 60. The view of the storm from the member aircraft can then be presented.

Other embodiments and configurations may be devised without departing from the spirit of the invention and the scope of the appended claims.

The invention claimed is:

1. A weather data aggregation and display system for integrating weather radar information from multiple aircraft and displaying the integrated weather radar information to a pilot of a member aircraft of an airborne network of member aircraft, said weather data aggregation and display system, comprising:
    an airborne network system (ANS) positioned on the member aircraft configured to receive a continuous constant stream of incoming geo-referenced radar reflectivity information regarding a) Significant Meteorological Systems (SMS) and b) geographic regions with no threatening precipitation, from associated airborne network systems positioned on other member aircraft, said ANS comprising a high bandwidth ad hoc network;
    a data processing system (DPS) coupled to said airborne network system for integrating said incoming radar reflectivity information and generating the member aircraft's perspective of said SMS, based on the integrated radar reflectivity information and the member aircraft's navigation and attitude information, said DPS providing DPS output radar reflectivity information comprising three-dimensional weather graphics; and,
    an airborne display system (ADS) positioned on the member aircraft and coupled to said data processing system, said airborne display system being adapted to receive said DPS output radar reflectivity information and in response thereto display desired weather imagery of said Significant Meteorological Systems,
    wherein said ANS is adapted to re-transmit said incoming geo-referenced radar reflectivity information to associated airborne network systems positioned on other member aircraft.

2. The system of claim 1, further including a weather radar system (WRS) coupled to said ANS for providing WRS output data to said ANS, wherein said ANS is capable of transmitting said WRS output data to other associated airborne network systems positioned on other member aircraft.

3. The system of claim 1, further including a weather radar system (WRS) coupled to said DPS for providing WRS output data to said DPS.

4. The system of claim 1, further including a weather radar system (WRS) coupled to said DPS via said ANS, said WRS providing WRS output data to said ANS which is utilized by said ANS in providing DPS directed ANS output to said DPS.

5. The system of claim 1, wherein said DPS comprises a graphics processing system.

6. The system of claim 1, wherein said DPS comprises a graphics processing system for providing composite weather graphics to said ADS.

7. The system of claim 1, wherein said DPS comprises a graphics processing system for providing composite weather graphics to said ADS defined in ARINC 708.

8. The system of claim 1, wherein said DPS comprises a graphics processing system for providing composite weather graphics to said ADS defined in ARINC 661.

9. The system of claim 1, wherein said DPS comprises a graphics processing system for providing composite weather graphics to said ADS defined in a next generation of ARINC 661 or equivalent.

10. The system of claim 1, wherein said DPS comprises a graphics processing system for providing composite weather graphics to said ADS defined in a standard commercial markup language.

11. The system of claim 1, wherein said DPS provides advisories, alerts, and advanced weather graphics to said ADS.

12. The system of claim 1, wherein said DPS provides ARINC 708 interface data and aircraft position and altitude data to said ADS.

13. The system of claim 1, wherein said DPS provides ARINC 661 interface data and aircraft position and altitude data to said ADS.

14. The system of claim 1, further comprising an airborne navigation and attitude system (ANAS) coupled to said DPS and ANS for sensing and distributing aircraft position and altitude ANAS output data to said DPS and said ANS.

15. The system of claim 1, wherein said airborne network system (ANS) comprises a direct aircraft-to-aircraft communications network.

16. The system of claim 1, wherein said airborne network system (ANS) comprises an indirect aircraft-to-aircraft communications network utilizing ground-based communications stations.

17. The system of claim 1, wherein said airborne network system (ANS) utilizes an indirect aircraft-to-aircraft communications network utilizing a satellite-based network.

18. A weather data aggregation and display system for integrating weather radar information from multiple aircraft and displaying the integrated weather radar information to a pilot of a member aircraft of an airborne network of member aircraft, said weather data aggregation and display system, comprising:
    an airborne network system (ANS) positioned on the member aircraft configured to receive a continuous constant stream of incoming geo-referenced radar reflectivity information regarding a) Significant Meteorological Systems (SMS) and b) geographic regions with no threatening precipitation, from associated airborne network systems positioned on other member aircraft, said ANS comprising a high bandwidth ad hoc network;
    a data processing system (DPS) coupled to said airborne network system for integrating said incoming radar reflectivity information and generating the member aircraft's perspective of said SMS, based on the integrated radar reflectivity information and the member aircraft's navigation and attitude information, said DPS providing DPS output weather data comprising three-dimensional weather graphics;
    an airborne display system (ADS) positioned on the member aircraft and coupled to said data processing system, said airborne display system being adapted to receive said DPS output radar reflectivity information and in response thereto display desired weather imagery of said Significant Meteorological Systems;
    a weather radar system (WRS) coupled to said ANS for providing WRS output data to said ANS, wherein said ANS is capable of transmitting said WRS output data to other associated airborne network systems positioned on other member aircraft; and, an airborne navigation and attitude system (ANAS) coupled to said DPS and ANS for sensing and distributing aircraft position and altitude ANAS output data to said DPS and said ANS, wherein said ANS is adapted to re-transmit said incoming geo-referenced radar reflectivity information to associated airborne network systems positioned on other member aircraft.

19. An airborne network of member aircraft capable of communicating with each other for aggregating and displaying weather data, each member aircraft in said airborne network having a weather data aggregation and display system for displaying weather radar information to a pilot of a member aircraft, each said weather data aggregation and display system, comprising:

an airborne network system (ANS) positioned on the member aircraft configured to receive a continuous constant stream of incoming geo-referenced radar reflectivity information regarding a) Significant Meteorological Systems (SMS) and b) geographic regions with no threatening precipitation, from associated airborne network systems positioned on other member aircraft, said ANS comprising a high bandwidth ad hoc network;

a data processing system (DPS) coupled to said airborne network system for integrating said incoming radar reflectivity information and generating the member aircraft's perspective of said SMS, based on the integrated radar reflectivity information and the member aircraft's navigation and attitude information, said DPS providing DPS output weather data comprising three-dimensional weather graphics; and, an airborne display system (ADS) positioned on the member aircraft and coupled to said data processing system, said airborne display system being adapted to receive said DPS output radar reflectivity information and in response thereto display desired weather imagery of said Significant Meteorological Systems, wherein said ANS is adapted to re-transmit said incoming geo-referenced radar reflectivity information to associated airborne network systems positioned on other member aircraft.

\* \* \* \* \*